US009600809B2

(12) United States Patent
Crist et al.

(10) Patent No.: US 9,600,809 B2
(45) Date of Patent: Mar. 21, 2017

(54) STACKING PURGE-BIN

(71) Applicant: Bank of America Corporation, Charlotte, NC (US)

(72) Inventors: Kristy M. Crist, Charlotte, NC (US); Terrelle Carswell, Charlotte, NC (US); Eric McConnell, Cornelius, NC (US); Rahul Puri, Charlotte, NC (US); Devin D. Rhodes, Lexington, KY (US); James D. Goodwin, Kansas City, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/987,711

(22) Filed: Jan. 4, 2016

(65) Prior Publication Data

US 2016/0117880 A1 Apr. 28, 2016

Related U.S. Application Data

(62) Division of application No. 13/897,530, filed on May 20, 2013, now Pat. No. 9,251,672.

(51) Int. Cl.
*G06K 7/00* (2006.01)
*G06Q 20/10* (2012.01)
*G07F 19/00* (2006.01)
*B65H 33/04* (2006.01)
*B65H 29/46* (2006.01)
(Continued)

(52) U.S. Cl.
CPC ......... *G06Q 20/1085* (2013.01); *B65H 29/46* (2013.01); *B65H 33/04* (2013.01); *B65H 33/08* (2013.01); *G07D 11/0057* (2013.01); *G07D 11/0084* (2013.01); *G07F 19/203* (2013.01); *B65H 2301/4214* (2013.01); *B65H 2301/4263* (2013.01); *B65H 2301/42114* (2013.01); *B65H 2408/13* (2013.01); *B65H 2701/1912* (2013.01)

(58) Field of Classification Search
USPC .......................................... 235/375, 379, 380
See application file for complete search history.

(56) References Cited

U.S. PATENT DOCUMENTS 5,597,996 A * 1/1997 Flood ................. G07D 11/0081
235/379
2007/0122023 A1* 5/2007 Jenrick .................. G07D 7/162
382/135

* cited by examiner

*Primary Examiner* — Matthew Mikels
(74) *Attorney, Agent, or Firm* — Weiss & Arons LLP; Michael A. Springs, Esq.

(57) ABSTRACT

Apparatus and methods for a stacking purge-bin ("SPB") are provided. The SPB may be configured to rotate. The SPB may include a plurality of receiving sections. One or more tangible items retracted by the SSK may be stored in each receiving section. Rotating the SPB between each retraction may prevent tangible items from two consecutive retractions from being stored in a single receiving section. Preventing tangible items from two consecutive retractions from being stored in a single receiving section may allow each tangible item to be associated with transaction information corresponding to a retraction. The SPB may store separators. A separator may be inserted between tangible items received from two consecutive retractions. Separating between tangible items received from two consecutive retractions may allow each tangible item to be associated with transaction information corresponding to a retraction. Transaction information associated with a retraction may be marked on the separator.

12 Claims, 9 Drawing Sheets

(51) Int. Cl.
*B65H 33/08* (2006.01)
*G07D 11/00* (2006.01)

STACKING PURGE-BIN

CROSS REFERENCE TO RELATED APPLICATIONS

This application is a divisional of U.S. application Ser. No. 13/897,530 filed on May 20, 2013, which is hereby incorporated by reference in its entirety.

FIELD OF TECHNOLOGY

Aspects of the invention relate to reducing costs associated with automated teller machine ("ATM") mis-dispense claims.

BACKGROUND

ATMs provide banking customers an ability to access bank account information, deposit funds and withdraw cash. ATMs may often obviate the need for a banking customer to consult with a human clerk. Additionally, ATMs may be located in a variety of diverse locations. These locations may be remote from banking centers. For example, ATMs may be placed on street corners, in convenience stores, supermarkets or sports arenas.

In a typical ATM transaction, the customer may submit a request for a withdrawal of an amount of cash. The ATM may determine whether the customer has a bank account balance corresponding to, at least, a value of the requested cash. If the customer has a sufficient bank account balance, the ATM may dispense the requested amount of cash.

The ATM may present the requested amount of cash to the customer. If the customer does not collect all of the dispensed cash, the ATM may be configured to retract the uncollected cash. The ATM may be configured to wait for an expiration of a "time out" period before retracting cash.

An ATM customer may not retrieve all, or a portion of, dispensed cash as a result of an ATM malfunction. For example, the customer may submit a request for $80.00 in twenty-dollar notes and the ATM may erroneously dispense $40.00 in ten-dollar notes. As a further example, the ATM may not provide sufficient time for the customer to become aware that the cash has been dispensed. The ATM may retract cash before the customer has time to collect dispensed cash.

In response to a retraction of cash by the ATM, a customer may submit a mis-dispense claim. The customer may submit the mis-dispense claim to an operator of the ATM. The customer may submit the mis-dispense claim to an entity responsible for managing a bank account of the customer.

The customer may request a credit for uncollected cash retracted by the ATM. The customer may request that, because cash was retracted by the ATM, the account of the customer should not be debited. The customer may allege that none of a requested amount of cash, or a portion of a requested amount of cash, was collected by the customer.

A wide variety of ATM locations and lack of close supervision at an ATM increases a risk that a customer may submit an unwarranted mis-dispense claim. For example, the customer may intentionally collect only a portion of dispensed cash. The customer may then submit a mis-dispense claim alleging not to have collected any of the dispensed cash. Unwarranted mis-dispense claim have become so prevalent that some ATM operators have disabled a cash retraction feature of ATMs.

It would be desirable to provide a solution that collates cash retracted by an ATM following an unsuccessful customer withdrawal. Examination of the collated cash may provide information useful in a processing of mis-dispense claims and fraud research. For example, the examination may provide details such as denomination, number of bills retracted and a transaction identifier associated with the retraction. Examining of collated cash may allow the examined cash to be associated with a customer or customer account.

Additionally, a cost of operating an ATM or a network of ATMs is a requirement to replenish a cash supply of an ATM. Typically, ATMs may be replenished with cash between bi-weekly to per-day. Some ATMs in busy locations must be replenished twice a day. ATM operators may be reluctant to stock ATMs with additional cash because until the cash is dispensed from the ATM the cash is idling, increasing an opportunity cost of the cash. On the other hand, restricting the amount of cash that may be withdrawn by a customer may inconvenience and irritate the customer. Armored personnel and services are typically employed to deliver cash to an ATM, further increasing the cost of replenishing the cash supply of an ATM.

An examination of cash dispensed or retracted by an ATM may indicate that a cash inventory of the ATM is not being efficiently utilized. Obtaining accurate information relating to cash dispensing or retracting may allow an ATM operator to better manage a cash inventory of an ATM or network of ATMs.

For example, an ability to examine cash prior to dispensing the cash may verify that genuine notes of the correct denomination are being dispensed from the ATM. The examination may reduce a cost of dispensing counterfeit notes, non-currency items or incorrect denominations that may have been erroneously loaded into the ATM. Detection of an erroneous loading of cash into the ATM may identify a human error or a process breakdown related to cash inventory.

Therefore, it would be desirable to obtain detail associated with cash dispensed or retracted from an ATM. It would be desirable to obtain a transaction detail associated with cash dispensed or retracted from an ATM. The transaction detail may supply information used in managing cash supplied to an ATM.

Therefore, it would be desirable to provide apparatus and methods for a stacking purge-bin.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
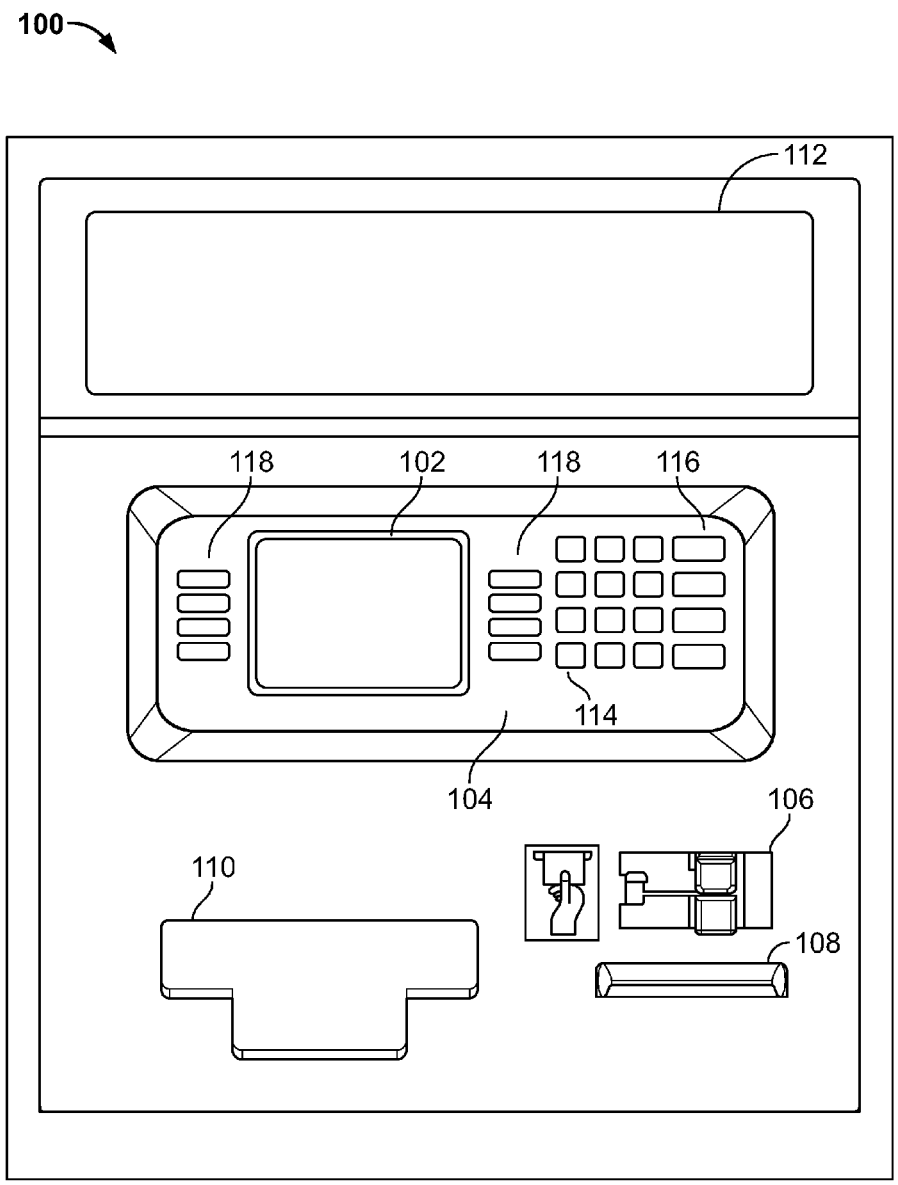
FIG. 1 shows an illustrative apparatus in accordance with principles of the invention.

Apparatus and methods for a stacking purge-bin ("SPB") are provided. Apparatus and methods may be applied to cash dispensing equipment including ATMs, currency recyclers and self-checkout machines located at retail merchants. Apparatus and methods may be applicable to dispensing of non-cash items—i.e., airport kiosks, self-serve movie theater kiosks—and any suitable self-service kiosk that dispenses or retracts a tangible item. The tangible item may include currency, lottery tickets, transportation tickets, boarding passes or any tangible item dispensed by a SSK.

Apparatus for an anti-fraud system for a self-service kiosk ("SSK") are provided. The SSK may be an ATM. The ATM may include a dispenser. The dispenser may be configured to present a tangible item to a customer. The dispenser may present the tangible item to the customer in response to a request submitted by the customer. The dispenser may be configured to retract the tangible item. The dispenser may be configured to retract the tangible item after the tangible item is presented to the customer. The dispenser may be configured to retract the tangible item after expiration of a "time out" period. The time out period may be any suitable period of time such as five seconds, ten seconds, fifteen seconds, one minute or five minutes.

The ATM may include an acceptor. The acceptor may be configured to receive a deposit from the customer. The deposit may include any suitable tangible item. For example, the deposit may include cash, checks, or coins.

The ATM may include a purge-bin. The purge-bin may store one or more tangible items retracted by a dispenser. The tangible item may be transferred from the dispenser to the purge-bin using a feeder network. The feeder network may be configured to transfer one or more tangible items between components of the ATM. The purge-bin may store a tangible item deposited at the ATM. The tangible item may be transferred from the acceptor to the purge-bin using the feeder network. The feeder network may position a tangible item in the purge-bin or other suitable ATM component.

The ATM may include a storage-bin. The storage-bin may store one or more separators. A separator may be a tangible item. The feeder network may be configured to extract a separator from the storage-bin. The feeder network may be configured to transfer the separator to a component of the ATM. For example, the feeder network may transfer a separator from the storage-bin to the purge-bin. The feeder network may position the separator in the purge-bin.

The ATM may include a printer. The printer may be configured to print information on a separator. The separator may be transferred to the printer. The printer may be configured to print information on the separator before the separator is extracted from the storage-bin. The separator may be transferred from the printer to the purge-bin. The separator may be transferred using the feeder network.

The ATM may position the separator. The ATM may position the separator using the feeder network. The ATM may position the separator after printing information on the separator. Information may be printed on the separator after the separator is positioned by the feeder network. The separator may be positioned using the feeder network.

The separator may be positioned adjacent to a plurality of bills. The plurality of bills may be stored in the purge-bin. For example, the purge-bin may be configured to receive a plurality of bills. The plurality of bills may include bills retracted by the dispenser. Retracted bills may be transferred from the dispenser to the purge-bin. The feeder network may transfer retracted bills to the purge-bin.

The feeder network may be configured to position the plurality of bills. The plurality of bills may be positioned in the purge-bin. The feeder network may be configured to position a separator. The separator may be positioned in the purge-bin. The separator may be positioned in the purge-bin adjacent to the plurality of bills. The separator may be positioned above the bills. The separator may be positioned below the bills. The separator may be positioned in the purge-bin after information is printed on the separator. A position of the separator in the purge-bin may collate contents of the purge-bin.

The information printed on the separator may correspond to one or more actions of the ATM. Illustrative actions that may be performed by an ATM are shown below in Table 1.

TABLE 1

| Illustrative actions performed by an ATM |
|---|
| Illustrative Actions Performed by an ATM |
| Authenticate customer |
| Access customer account information |
| Dispense cash |
| Receive deposit from a customer |
| Validate deposit |
| Retract cash |
| Print receipt |
| Validate dispensed cash |
| Validate retracted cash |
| Transfer retracted cash to purge-bin |
| Weigh cash |

The information printed on the separator may associate bills adjacent to the separator with one or more actions performed by the ATM. The information printed on the separator may associate bills positioned adjacent to the separator with a customer or a customer account. The information printed on the separator may indicate if the separator is associated with tangible items positioned above or below the separator.

When one or more tangible items stored in the purge-bin are removed from the purge-bin, the removed items may be examined. Examining items removed from the purge-bin may provide details about the removed items such as denomination, authenticity, number of items retracted and a transaction identifier. The details may be associated with the information printed on the separator.

A result of the examination may be associated with the information printed on the separator. For example, the information printed on the separator may indicate that bills stored in the purge-bin below a first separator and above a second separator are all associated with a single retraction. The bills may be extracted from the purge-bin and examined.

The examination may determine a first value of the bills. The first value may be associated with a transaction identifier printed on the first separator. The transaction identifier may be linked to a customer account or customer. The transaction identifier may correspond to one or more actions performed by the ATM.

The transaction identifier may correspond to a withdrawal request. Based on a difference between a first value of bills requested by the customer in the withdrawal request and a second value of the retracted bills stored in the purge-bin, an entity may determine an amount of cash collected by the customer prior to the retraction. The amount of cash may determine an amount of cash that may be refunded to the customer in response to a mis-dispense claim.

A purge-bin of the ATM may include a floor. The floor may support one or more tangible items stored in the purge-bin. The purge-bin may rotate. The floor may rotate. The floor and/or purge-bin (collectively hereinafter "purge-bin") may rotate about an axis. The purge-bin may rotate about the axis in response to a retraction of a tangible item.

The purge-bin may include a bill receiving section. The purge-bin may include a first bill receiving section. The first bill receiving section may receive a first set of bills. The first set of bills may be received after a retraction. The retraction may be a first retraction.

A rotation of the purge-bin may align the first bill receiving section with the feeder network. When the first bill receiving section is aligned with the feeder network, the feeder network may transfer a first tangible item into the first bill receiving section. The first bill receiving section may store the first set of bills.

The purge-bin may include a second bill receiving section. The second bill receiving section may be perpendicular to the first bill receiving section. The second bill receiving section may be oriented at any suitable angle to the first bill receiving section. The second bill receiving section may receive a second set of bills. The second set of bills may be received after a retraction. The retraction may be a second retraction.

A rotation of the purge-bin and/or floor of the purge-bin may align the second bill receiving section with the feeder network. When the second bill receiving section is aligned with the feeder network, the feeder network may transfer a second tangible item into the second bill receiving section. The second tangible item may be a second set of bills. The second bill receiving section may store the second set of bills.

The second bill receiving section may be configured to position the second set of bills. The second set of bills may be positioned perpendicular to the first set of bills. Storing the first set of bills in the first bill receiving section and the second set of bills in the second receiving section may collate the bills stored in the purge-bin.

The ATM may associate transaction information with each rotation of the purge-bin. The transaction information may include one or more actions performed by the ATM. Illustrative actions are shown above in FIG. 1. The transaction information may be associated with a rotation number. The rotation number may correspond to a total number of rotations of the purge-bin. A relationship between the transaction information and associated rotation number may be logged by the ATM.

The purge-bin may store a plurality of sets of bills. Each of the sets of bills may be positioned perpendicular to each other. The plurality of sets of bills may be removed from the purge-bin. Each set of bills may correspond to a rotation number. The rotation number may link the set of bills to logged transaction information associated with the set of bills.

The set of bills may be examined. The set of bills may be examined after being removed from the purge-bin. The examination may include determining a value of the set of bills. The examination may include determining an authenticity of each bill included in the set of bills. The value may be associated with the transaction information. Based on the transaction information, the value of the set of bills may be associated with an action of the ATM. Based on the transaction information, the value of the set of bills may be associated with a customer or customer account.

Based on the value and customer account associated with the value, an entity may determine a refund amount for a mis-dispense claim submitted by the customer. For example, a customer may submit a mis-dispense claim alleging that an in response to a request for $200.00, an ATM only dispensed $50.00. An ATM operator may determine that the customer's request is associated with a purge-bin rotation number. The ATM operator may further determine that the purge-bin rotation number is associated with a set of bills valued at $150.00. Based on the information associated with the rotation number, the ATM operator may approve the refund amount requested in the customer's mis-dispense claim.

Methods for stacking items in a purge-bin are provided. The methods may be performed by an apparatus. The apparatus may include a non-transitory computer readable medium. The non-transitory computer readable medium may include computer readable program code embodied therein. The apparatus may include a processor. The processor may be configured to execute the computer readable program code.

The purge-bin may be included in any suitable self-service kiosk ("SSK"). The SSK may be an ATM. The SSK may include a dispenser. The dispenser may present one or more tangible items to a customer. The dispenser may present the one or more tangible items to the customer in response to a request submitted by the customer. The customer may collect a number of the presented tangible items. The uncollected portion of tangible items may be retracted by the SSK.

The methods may include retracting a plurality of tangible items. The tangible item may be a bill, cash, check, U.S. Treasury Note or any suitable tangible item. The SSK may retract a coin. The tangible items may include a plurality of bills. A dispenser may retract one or more of the bills. The bills may be retracted after expiration of a time-out period. The retracted bills may have been previously presented to a customer via an SSK dispenser.

For example, at an SSK, a customer may purchase three lottery tickets. The SSK may dispense three lottery tickets. The customer may collect one of the three dispensed lottery tickets. The SSK may retract the two uncollected lottery tickets.

The SSK may include a purge-bin. The dispenser may be coupled to the purge-bin. The dispenser and purge-bin may be coupled via a feeder network. The feeder network may be configured to transfer one or more tangible items within the ATM. The feeder network may transfer a tangible item from the dispenser to the purge-bin. The purge-bin may store one or more tangible items. The purge-bin may store one or more retracted tangible items. Tangible items stored in the purge-bin may be stacked within the purge-bin. The stacking may collate the tangible items stored in the purge-bin.

The SSK may generate a separator. The separator may be a tangible item. The separator may be constructed of materials such as cardboard, paper, metal or any other suitable material. Generating the separator may include printing information on the separator. The information may include transaction information. The transaction information may include customer account information. The information may include one or more actions performed by the SSK. Illustrative actions performed by an SSK are shown above in table 1. Generating the separator may include extracting the separator from a storage-bin.

The separator may be stored in the purge-bin. The separator may be inserted adjacent to a plurality of bills stored in the purge-bin. The separator may be stored above a plurality of tangible items previously stored in the purge-bin. The plurality of tangible items may be stored in the purge-bin after the separator is inserted into the purge-bin.

Generating the separator may include relating information. The SSK may also log a transaction identifier corresponding to one or more actions performed by the SSK. The transaction identifier may correspond to a dispensing of a plurality of tangible items. The relating may include establishing a link between two or more actions performed by a SSK.

For example, a SSK may perform a dispensing in response to a customer request to withdraw an amount of currency from an account of the customer. The dispensing may be associated with first a time and date. After the dispensing, the SSK may retract any uncollected cash. The SSK may log a second time and date of the retracting.

A temporal relationship between the first time of dispensing and the second time of retracting may link the retracting and the dispensing. The temporal relationship may include a dispensing and retracting that occur within a threshold time period.

In some embodiments, a shared transaction identifier may link the retracting and the dispensing. The shared transaction identifier may include a SSK session ID. The session ID may link one or more actions performed by the SSK. The session ID may link one or more SSK actions initiated with a set of customer credentials.

The SSK may mark the separator. The SSK may mark the separator by printing information on the separator. The separator may be marked by applying an ultraviolet identifier to the separator. The separator may be marked using an embosser. The separator may be marked in any suitable fashion. A marked separator may be positioned in the purge-bin adjacent to a retracted tangible item. The position of the marked separator may associate the retracted tangible item with information included in the mark applied to the separator.

Information marked on the separator may include transaction information. The mark applied to the separator may include transaction information. The mark applied to the separator may include related transaction information. For example, the mark may include a first transaction identifier corresponding to a dispensing and a second transaction identifier corresponding to a retracting that is temporally linked to the dispensing. The mark may include a session ID, a time, date or any suitable information.

A position of the marked separator in a purge-bin may associate a retracted tangible item with transaction information included in the mark applied to the separator. Based on an association between the transaction information and the retracted tangible item, an entity may determine a value of one or more dispensed tangible items collected by a customer from a SSK.

For example, the entity may examine the retracted tangible item stored adjacent to the separator. Examination of a tangible item may provide details such as denomination, number of items retracted and a transaction identifier associated with the retraction or deposit. A validator may be configured to perform one or more examination routines.

The position of the separator in a purge-bin may link the transaction information marked on the separator to the retracted tangible item stored in the purge-bin. The transaction information marked on the separator may include a value of one or more tangible items dispensed to the customer. A difference between a first value of the dispensed tangible items and a second value of the retracted tangible items may correspond to a third value of tangible items collected by the customer. Based on the third value of tangible items collected by the customer, the entity may deny a mis-dispense claim that requests a refund amount greater than the third value.

A first plurality of tangible items may be stored in a purge-bin. The first plurality of tangible items may be stored in the purge-bin after being retracted by a SSK. The SSK may generate a first separator. The SSK may generate the first separator in response to the retracting of the first plurality of tangible items. The first separator may be marked with first transaction information. The first transaction information may include a first session ID or any suitable transaction information.

The first separator may be inserted above the first plurality of tangible items. A position of the first separator above the first plurality of tangible items may associate the first separator and information marked on the first separator with the first plurality of tangible items.

The SSK may retract a second plurality of tangible items. The second plurality of tangible items may be stored in the purge-bin adjacent to the first separator. The second plurality of tangible items may be stored above the first separator.

The SSK may generate a second separator. The SSK may generate the second separator in response to the retracting of the second plurality of tangible items. The second separator may be marked with second transaction information. The second transaction information may include a second session ID or any suitable transaction information. The second separator may be inserted above the second plurality of tangible items.

A position of the second separator above the second plurality of tangible items may associate the second separator and information marked on the second separator with the second plurality of tangible items.

The SSK may be configured to position the first plurality of bills. The SSK may position the first plurality of bills by rotating at least a portion of the purge-bin. The SSK may be configured to position the second plurality of bills. The SSK may position the second plurality of bills by rotating at least a portion of the purge-bin.

The second plurality of bills may be positioned on top of the first plurality of bills. The second plurality of bills may be positioned adjacent to the first plurality of bills. The second plurality of bills may be positioned perpendicular to the first plurality of bills. The second plurality of bills may be positioned at a ninety degree angle or any suitable angle relative to the first plurality of bills.

The purge-bin may be removable from the SSK. Removal of the purge-bin from the SSK may not disturb a positioning of the first plurality of tangible items relative to the second plurality of tangible items. Removal of the purge-bin from the SSK may not disturb a positioning of the first separator relative to the second separator. Transporting the purge-bin may not disturb a positioning of the first separator relative to the second separator.

The methods may include transferring contents of the purge-bin to a validator. The validator may be configured to examine a tangible item. The tangible item may be any suitable tangible item. For example, the tangible item may include currency, bank notes, event tickets, transportation tickets, lottery tickets and airline boarding passes.

Examination of a tangible item may provide details such as denomination, number of items retracted and a transaction identifier associated with a retraction or deposit. A validator may be configured to perform one or more examination routines.

The validator may determine a value of contents stored in the purge bin. The contents may include one or more tangible items. The value may be the value of the plurality of tangible items positioned below the first separator. The plurality of bills may be bills positioned below the second separator. A result of the examination may be associated with a separator. A result of the examination may be associated with tangible items stored in the purge-bin. The tangible items stored in the purge-bin may correspond to the separator.

The methods may include generating a fraud record. The fraud record may be generated based on a value of the contents of the purge-bin. The fraud record may be based on a transaction identifier associated with one or more tangible items stored in the purge-bin. The transaction identifier may be printed on a separator.

The methods may include transmitting the fraud record. The fraud record may be transmitted to a customer. The fraud record may be transmitted to a financial institution. The fraud record may be transmitted to a fraud detection unit of the financial institution. The fraud record may be transmitted in response to receiving a claim. The claim may be received by an entity. The entity may service one or more accounts of a customer. The entity may be an operator of a SSK. The claim may be transmitted by the customer. The claim may be a mis-dispense claim.

Methods for storing bills in a purge-bin of an ATM are provided. The ATM may include a dispenser. The dispenser may be configured to dispense a plurality of bills. The dispenser may be configured to retract a plurality of bills.

In response to the retraction, the methods may include generating a separator record. The separator record may be generated by an ATM. The separator record may include a date. The separator record may include transaction information. The transaction information may include a date, time, a transaction identifier, a session ID or any suitable transaction information. The separator record may be stored in a database. The database may reside in a SSK. The database may reside at a location remote from the SSK. The SSK may transmit the separator record to the remote location.

The ATM may include a purge-bin. The purge-bin may include one or more separator tabs. A separator tab may form a partition inside the purge-bin. The partition may separate tangible items stored in the purge-bin. A separator tab may distinguish a first plurality of retracted bills stored in the purge-bin from a second plurality of retracted bills stored in the purge-bin.

The methods may include associating a separator record with a separator tab. The purge-bin may hold a first plurality of bills. The purge-bin may hold a second plurality of bills. In the purge-bin, the separator tab may separate the first plurality of bills from the second plurality of bills.

The separator tab may be biased by one or more biasing members. A biasing member may include a spring. A latch may maintain the separator tab in a first position relative to the purge-bin. When the tab is in the first position, a tangible item inserted into the purge-bin may pass the tab. In the first position, the tab may not obstruct movement of the tangible inside the purge-bin.

In response to an insertion of a tangible item into the purge-bin, an ATM may be configured to release the latch. The release of the latch may allow the biasing member to move the tab into a second position relative to the purge-bin. In the second position, the tab may obstruct movement of a tangible item stored in the purge-bin. In the second position, the tab may form a partition that separates a first tangible item from a second tangible item. In the second position, the tab may form a partition that separates a first plurality of tangible items from a second plurality of tangible items. The first plurality of tangible items may be associated with a first customer. The second plurality of tangible items may be associated with a second customer.

For example, a SSK may log a positioning of a separator tab. A release of the latch may generate an electronic signal. The electronic signal may correspond to a separator tab. The electronic signal may correspond to one of a plurality of separator tabs. Based on the electronic signal, a SSK may identify the positioned separator tab. The identified separator tab may be associated with a separator record. The separator record may be generated in response to a retraction. The latch may be released in response to the retraction. The identified separator tab may be associated with the separator record based on a temporal proximity of the release to the retraction or other action performed by the SSK.

The methods may include associating the separator record with an account of a customer. The separator record may be associated with the account based on transaction information such as a transaction identifier included in the separator record.

The methods may include extracting a plurality of tangible items from the purge-bin. The plurality of tangible items may be a plurality of bills. The methods may include resetting a separator tab. The extracting may include resetting a separator tab. The reset separator tab may be associated with a separator record. The associated separator record may correspond to a separator record generated within a temporal proximity of a release of the reset separator tab. The associated separator record may include transaction information identifying a customer or customer account.

A resetting of the separator tab may generate an electronic signal. The electronic signal may correspond to the separator tab. The electronic signal may identify the separator tab. Based on the electronic signal, the separator record associated with the reset separator tab may be identified.

The methods may include determining a value of a plurality of tangible items stored within a partition of the purge-bin. The methods may include associating the value with the separator tab that defines the partition. The separator tab that defines the partition may be a reset separator tab. The separator tab that defines the partition may be identified based on a signal transmitted when the separator tab is reset.

The methods may include associating the value with a separator record corresponding to the separator tab that defines the partition. The methods may include appending the value to the separator record. The methods may include transmitting the value to a remote location. The value may be associated with the separator record based on an identification of the reset separator tab.

The methods may include identifying a dispensed value. The dispensed value may be an amount of money dispensed by an ATM in response to a customer request. The dispensed amount may be identified based on transaction information included in the separator record.

For example, the separator record may include a SSK session ID. In a database, the session ID may be associated a dispensing of an amount of cash and a retracting of cash. The methods may include crediting the value to a customer account. The crediting may correspond to cash dispensed by a SSK to a customer and uncollected by the customer. The customer account may be identified based on a separator record. The separator record may be associated with the uncollected cash. The customer account may be included in the separator record.

The ATM may identify a customer request. The request may be a request for an amount of funds. The request may be associated with a transaction identifier. The transaction identifier may be included in a separator record.

The methods may include debiting a customer account. The debit may correspond to a difference between an amount of funds collected by the customer and a value of funds retracted by an ATM. The value of funds retracted by the ATM may be determined by examining one or more tangible items stored in a partition of a purge-bin. The partition may be associated with the customer account based on a separator record linked to a separator tab defining the partition.

The methods may include receiving a claim. The claim may be received by a computer system. The claim may be submitted by a customer. The claim may be a mis-dispense claim. The mis-dispense claim may allege that a SSK, such as an ATM, did not dispense an amount of cash requested by the customer. The claim may include a request for a refund amount.

The methods may include approving the refund amount. The methods may include denying the refund amount. The refund amount may be approved or denied based on a value of retracted cash stored in a partition of the purge-bin. The value of the retracted cash stored in the partition may be associated, based on a separator tab defining the partition, to a separator record. The separator record may include information that identifies a customer or customer account. The customer and/or customer account may be associated with the value of the retracted cash stored in the partition.

If the requested refund amount is greater than the value of the retracted cash stored in the partition, the refund amount may be denied. If the requested refund amount is less than or equal to the value of the retracted cash stored in the partition, the refund amount may be approved. If the refund amount is greater than or equal to the value of the retracted cash stored in the partition, an entity responsible for maintaining the customer account may credit the value of the retracted cash stored in the partition to the customer account. Without a receiving a request for a refund amount, the value of the retracted cash stored in the partition may be credited to the customer account.

Methods may include storing a plurality of retracted bills. The retracted bills may be stored in a purge-bin. The plurality of retracted bills may be enveloped in shrink wrap. Transaction information may be printed on the shrink wrap. The transaction information may link the retracted bills to a customer or account. The shrink wrapped bills may be stored in a purge-bin.

A separator may include a sleeve. The ATM may insert a plurality of retracted bills into the sleeve. The ATM may store the plurality of bills in the sleeve. The sleeve, including the retracted bills, may be stored in a purge-bin. Transaction information may be printed on the sleeve. The transaction information may link the retracted bills to a customer or account.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100. Self-service device 100 may be an ATM. Self-service device 100 may include monitor 102, keypad 104, card reader port 106, acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be the front end of any suitable card reader. The card reader may read magnetically encoded information on transaction instruments such as bank cards. In some embodiments (not shown), self-service device 100 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 100 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature.

Acceptor 108 may accept any suitable tangible item. For example, acceptor 108 may accept envelopes, deposit forms, bills, checks or any other suitable documents. In some embodiments, acceptor 108 may feed a tangible item into a scanner that digitizes the tangible item for image-based transaction processing.

Item dispenser 110 may dispense tangible items. For example, item dispenser 110 may dispense bills.

Security screen 112 may visually screen a surveillance device (not shown). The surveillance device may provide video information about individuals that are present near the self-service device. The surveillance device may provide video information about conditions near the self-service device.

Figure 2:
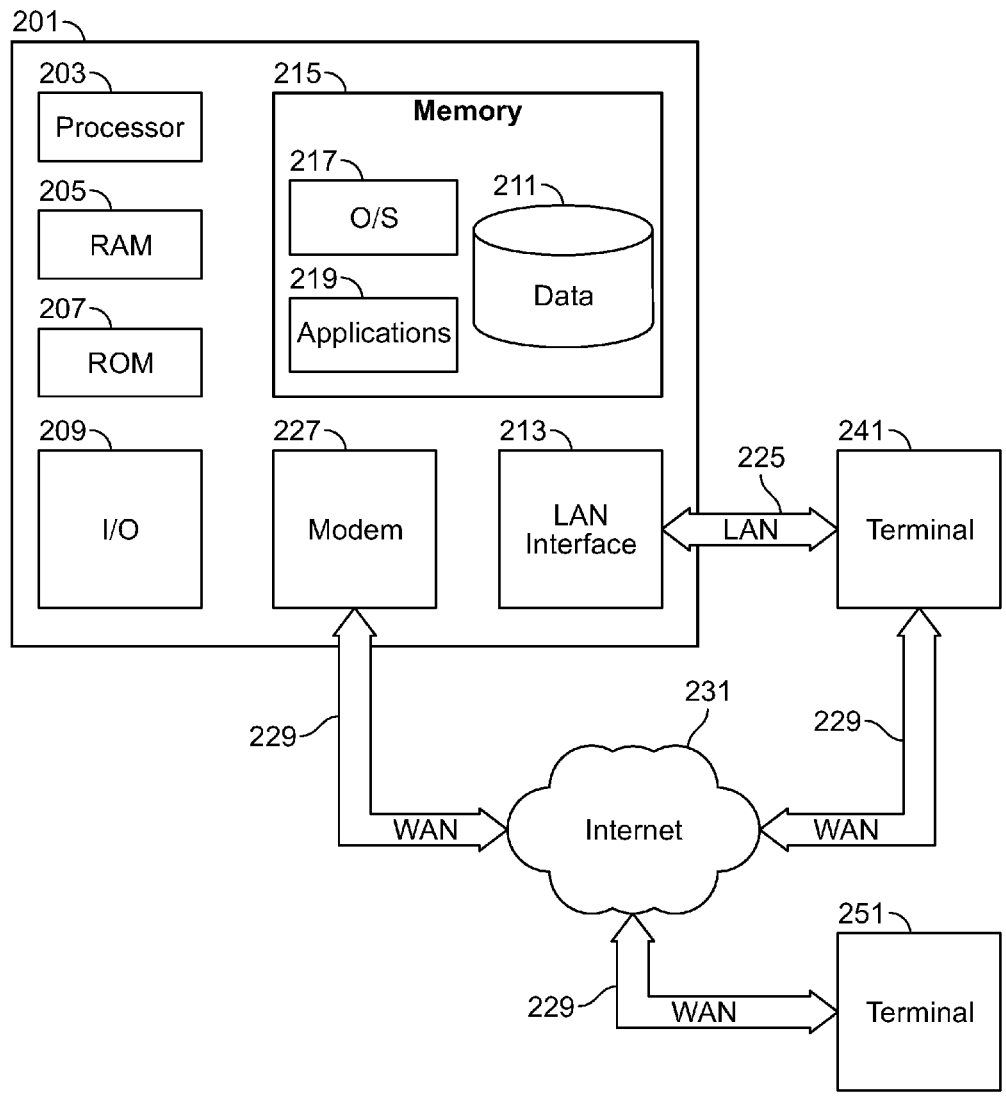
FIG. 2 shows an illustrative apparatus in accordance with principles of the invention.

FIG. 2 is a block diagram that illustrates a computing device 201 (alternatively referred to herein as a "server") that may be used according to an illustrative embodiment of the invention. The computer server 201 may have a processor 203 for controlling overall operation of the server and its associated components, including RAM 205, ROM 207, input/output ("I/O") module 209, and memory 215.

I/O module 209 may include a microphone, keypad, touch screen and/or stylus through which a user of device 201 may provide input, and may also include one or more of a speaker for providing audio output and a video display device for providing textual, audiovisual and/or graphical output. Software may be stored within memory 215 and/or other storage (not shown) to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown). Terminal 251 and/or terminal 241 may be portable devices such as a laptop, tablet, smartphone or any other suitable device for storing, transmitting and/or transporting relevant information.

Any information described above in connection with database 211, and any other suitable information, may be stored in memory 215. One or more of applications 219 may include one or more algorithms that may be used to transfer a tangible item, examine a tangible item, determine relationship between transactions, release separator tabs, reset separator tabs, identify related SSK actions, control rotation of a purge-bin and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
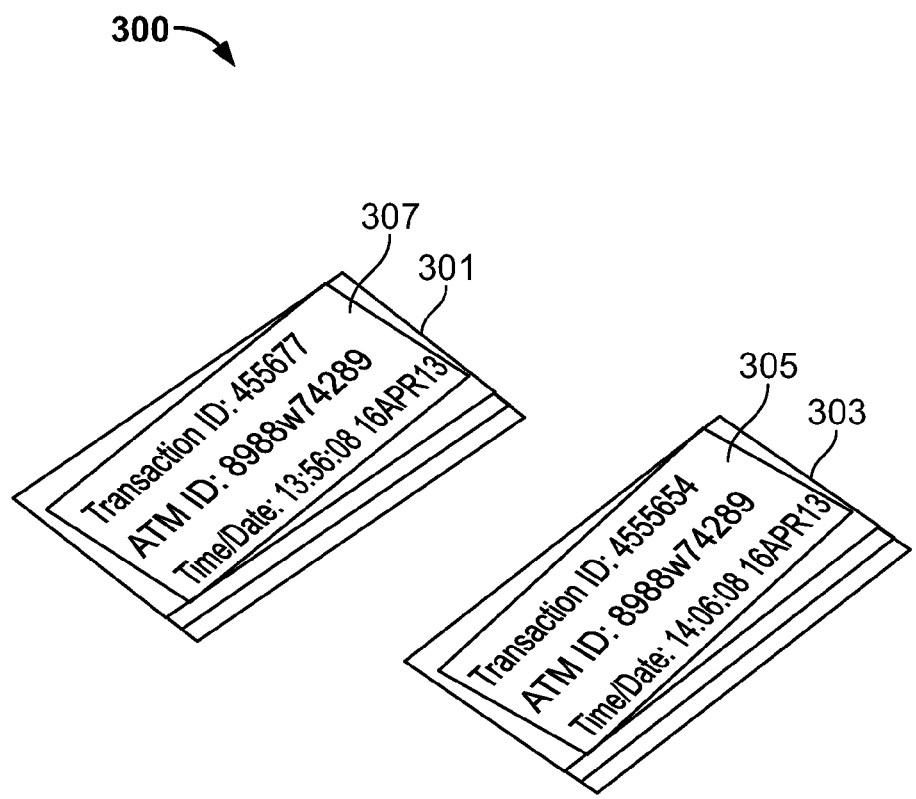
FIG. 3 shows an illustrative arrangement in accordance with principles of the invention.

FIG. 3 shows illustrative arrangement 300. Arrangement 300 includes stack 301. Stack 301 may include one or more tangible items. Stack 301 may include a plurality of tangible items. Stack 301 may include cash. Stack 301 may include cash retracted by an ATM.

Stack 301 may be retracted after a dispensing. For example, in response to a customer request for five bills, an ATM may dispense five bills. The customer may collect four bills. One bill may be retracted by the ATM.

Stack 301 may be stored in a purge-bin (not shown). Separator 307 is positioned adjacent to stack 301. Separator 307 may be positioned adjacent to stack 301 in a purge-bin. Separator 307 may be formed from paper, cardboard, metal or any other suitable material.

Separator 307 may include transaction information. The transaction information may be associated with the tangible items included in stack 301. For example, the transaction information may be associated with a retraction and/or dispensing of the tangible items included in stack 301. The transaction information may be marked on separator 307. Separator 307 may include transaction information encoded in a bar code, quick response ("QR") code or other machine readable information (not shown).

For example, transaction information marked on separator 307 includes transaction identifier "455677", ATM identifier "8988w74289," transaction time "13:56:08" and transaction date "16APR13." Based on the transaction information, the tangible items included in stack 301 may be associated with an action performed by a SSK, a customer or an account.

Arrangement 300 includes stack 303. Stack 303 is positioned adjacent to separator 305. Stack 303 may include one or more features of stack 301. Separator 305 may include one or more features of separator 307. Stack 303 may include retracted cash. Stack 303 may be transferred from a dispenser to a purge-bin. Stack 303 may be transferred using a feeder network of a SSK. Stack 303 may be stored in the purge-bin.

Stack 303 and separator 305 may be positioned in a purge-bin following a positioning of stack 301 and separator 307. In the purge-bin, stack 303 and separator 305 may be positioned above stack 301 and separator 307.

Separator 307 may be placed on top of stack 301. Stack 301 may be placed on top of separator 307. Stack 303 and separator 305 may be positioned in any suitable arrangement. Separator 305 may be placed on top of stack 303. Separator 305 and stack 303 may be positioned in any suitable arrangement.

Figure 4:
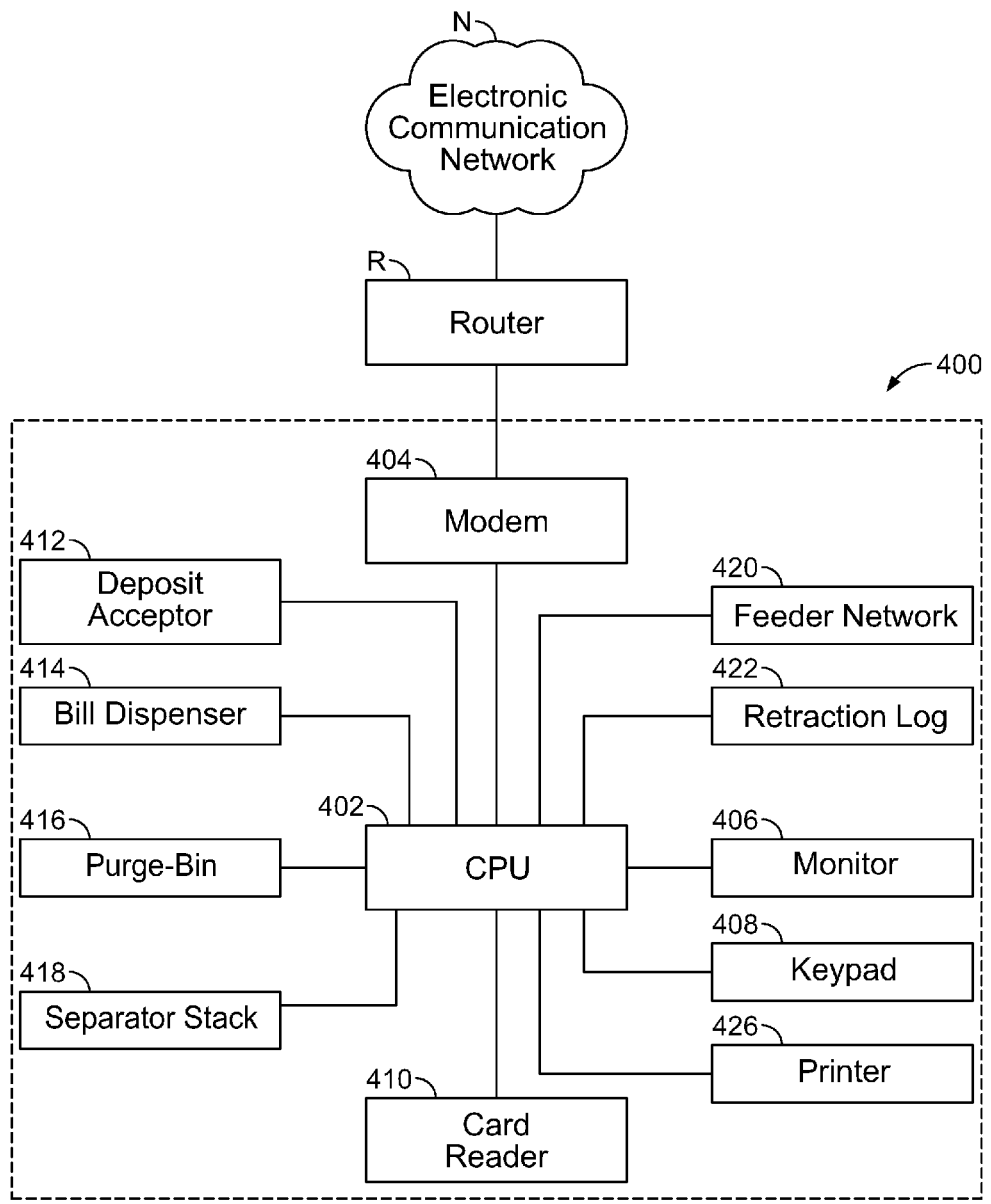
FIG. 4 shows an illustrative apparatus in accordance with principles of the invention.

FIG. 4 shows illustrative apparatus 400. Apparatus 400 may include a control system for controlling a self-service kiosk ("SSK") such as an ATM or self-service device 100 (shown in FIG. 1).

Apparatus 400 may be controlled by CPU 402. CPU 402 may include one or more features of server 201 (shown in FIG. 2). CPU 402 may exchange information with electronic communication network N via modem 404 and router R. The information may include transaction information.

CPU 402 may receive information from a customer via monitor 406, keypad 408, card reader 410, acceptor 412 or item dispenser 414. The information received from the customer may be included in a separator record.

CPU 402 may instruct a SSK to dispense bills through item dispenser 414. CPU 402 may instruct item dispenser 414 to retract any currency remaining in item dispenser 414 after expiration of a time-out period.

CPU 402 may receive a request to deposit bills. CPU 402 may transmit information to acceptor 412 instructing acceptor 412 to accept one or more tangible items inserted into acceptor 412.

CPU 402 may direct a transfer of retracted bills to purge-bin 416. CPU 402 may instruct purge-bin 416 to rotate prior to receiving the retracted bills. CPU 402 may issue an instruction directing a release of a separator tab (not shown) in purge-bin 416. CPU 402 may control a timing of the release of the separator tab. For example, CPU 402 may ensure that the release of the separator tab occurs after retracted bills are positioned in purge-bin 416.

CPU 402 may control an extraction of a separator (shown in FIG. 3) from separator stack 418. Purge-bin 416 may transmit a request for a separator to CPU 402. CPU 402 may control a transfer of the separator from separator stack 418 to purge-bin 416.

CPU 402 may control a transfer of a tangible item using feeder network 402. CPU 402 may control feeder network 420. Feeder network 420 may link acceptor 412, dispenser 414, purge-bin 416 and separator stack 418. Feeder network 420 may include rollers, belts, tracks, pickers or any suitable components.

CPU 402 may log information received from one or more components of apparatus 400. CPU 402 may transmit information received from one or more components of apparatus 400 to electronic communication network N using modem 404 and router R.

For example, retraction log 422 may record information associated with a retraction. Retraction log 422 may record a time of a retraction, an ATM session ID, credentials used to initiate the ATM session, an amount of cash requested by a customer, a customer account or any suitable information. CPU 402 may control a recording of the retraction information.

CPU 402 may generate a separator record. The separator record may include actions performed one or more components of apparatus 400. The separator record may include communications between on or more components of apparatus 400. The separator record may include any suitable information associated with a retraction. CPU 402 may identify suitable information associated with the retraction. The separator record may be stored in retraction log 422.

CPU 402 may control a printing of transaction information on a separator using printer 426. CPU 402 may instruct printer 426 to print information received from one or more components of apparatus 400. CPU 402 may instruct printer 426 to print information recorded in retraction log 422.

Figure 5:
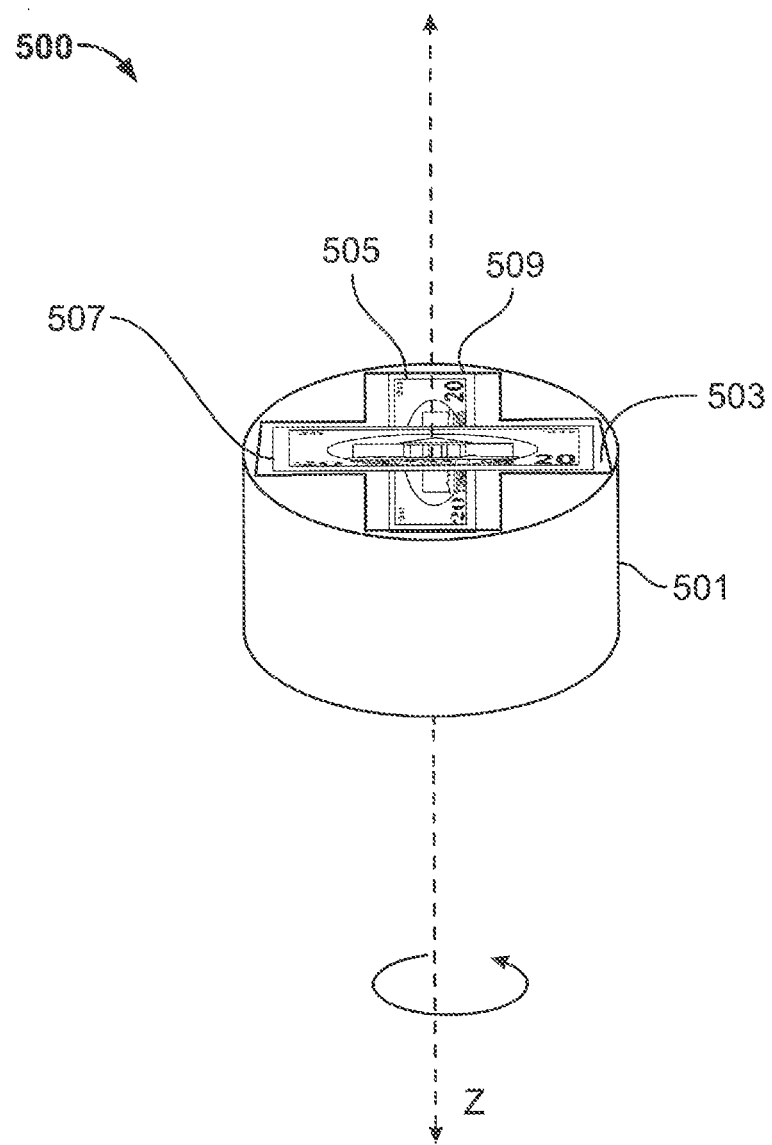
FIG. 5 shows an illustrative apparatus in accordance with principles of the invention.

FIG. 5 shows illustrative arrangement 500. Arrangement 500 includes purge-bin 501. Purge-bin 501 may include one or more features of purge-bin 416 (shown in FIG. 4). Purge-bin 501 includes first bill receiving section 503. First bill receiving section 503 may store bills 507. Purge-bin 501 includes second bill receiving section 509. Second bill receiving section 509 may store bills 505.

First bill receiving section 503 may be oriented perpendicular to second bill receiving section 509. Purge-bin 501 may include three or more bill receiving sections. A bill receiving section may store a stack of tangible items such as stacks 301 and 303 (shown in FIG. 3). The first bill receiving section may store a first stack. The second bill receiving section may store a second stack. The first and second stacks may be stored perpendicular to each other. Storing the first and second stacks perpendicular to each may collate the first and second stacks.

Purge-bin 501 may be configured to rotate about axis Z. Rotation of purge-bin 501 may align a bill receiving section with a feeder network, such as feeder network 420 (shown in FIG. 4). The feeder network may insert a bill into a bill receiving section of purge-bin 501. Purge-bin 501 may be rotated each time cash is retracted by a dispenser, such as dispenser 110 (shown in FIG. 1) or dispenser 414 (shown in FIG. 4). Rotating purge-bin 501 prior to storing retracted cash may separate cash from each retraction. Each rotation may be logged in retraction log 422 (shown in FIG. 4). Retraction log 422 may record transaction information associated with the retraction.

Purge-bin 501 may be removed from a SSK. Cash stored in purge-bin 501 may be extracted and examined. Results of the examination may be correlated to an entry in retraction log 422. Based on the correlating, a value of retracted cash may be associated with a customer, a customer account, a time/date, a location, a transaction identifier or any suitable transaction information.

Figure 6:
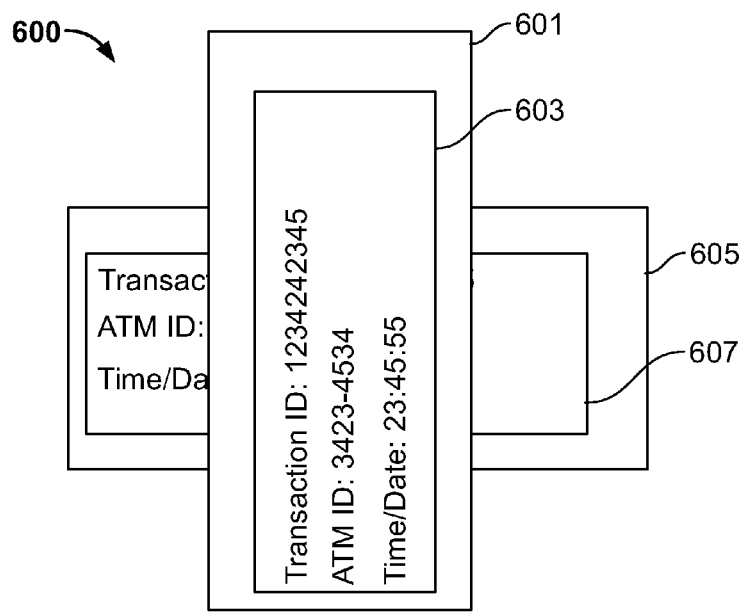
FIG. 6 shows an illustrative arrangement in accordance with principles of the invention.

FIG. 6 shows illustrative arrangement 600. Arrangement 600 includes stack 601 and stack 605. Stack 601 may be positioned adjacent to separator 603. Separator 603 includes illustrative transaction information such as transaction identifier "1234242345," ATM session ID "3423-4534," and time/date "23:45:55." The ATM session ID may link a plurality of transaction identifiers to the ATM session. The plurality of transaction identifiers may correspond to actions performed by the ATM during the ATM session.

Stack 605 may be positioned adjacent to separator 607. Stack 601 and separator 603 are positioned perpendicular to stack 605 and separator 607. Stack 601 and separator 603 may be positioned in first bill receiving section 503 (shown in FIG. 5). Stack 605 and separator 607 may be positioned in second bill receiving section 509 (shown in FIG. 5).

Figure 7:
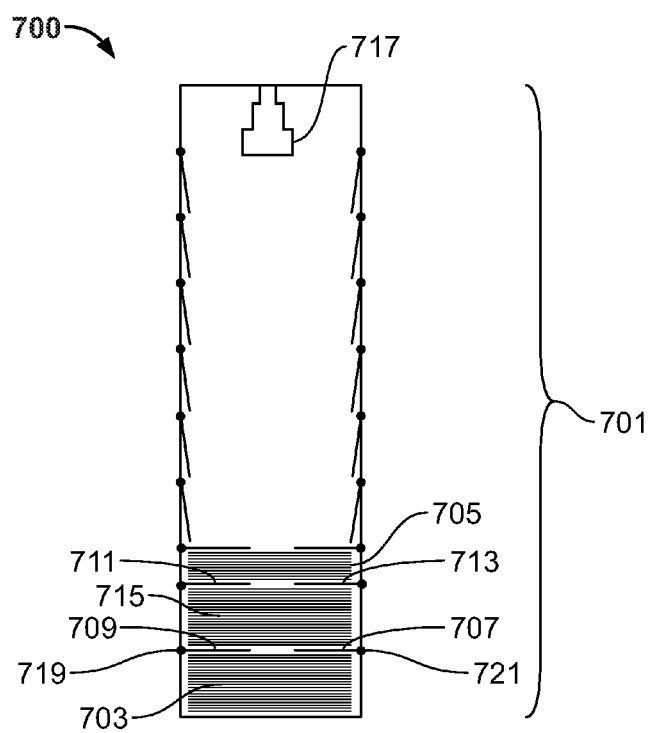
FIG. 7 shows illustrative apparatus in accordance with principles of the invention.

FIG. 7 shows a top-down view of purge-bin 700. Purge-bin 700 includes housing wall 701.

Purge-bin 700 may store stacks 703, 715 and 705. Each of stacks 703, 715 and 705 may include a plurality of tangible items. Each of stacks 703, 715 and 705 may include a plurality of tangible items retracted by a dispenser of a SSK.

Stack 703 may be positioned within housing 701 by separator tabs 709 and 707. Separator tabs 709 and 707 may define a first partition. The first partition may separate stack 703 from stack 715. Stack 703 may be associated with first transaction information. Stack 715 may be associated with second transaction information.

Stack 715 may be positioned within purge-bin 700 by separator tabs 711 and 713. Separator tabs 711 and 713 may define a second partition. The second partition may separate stack 715 from stack 705. The second partition may separate stack 715 from stack 703. Stack 715 may be associated with second transaction information. Stack 705 may be associated with third transaction information.

A release of separator tabs 709 and 707 may be recorded in a separator record stored in retraction log 422 (shown in FIG. 4). The separator record may include the first transaction information associated with the retraction of stack 703.

When stacks 703, 715 and 705 are removed from purge-bin 700, each of stacks 703, 715 and 705 may be examined. A result of the examination of each stack may be recorded in the separator record corresponding to each stack. The result of the examination may include a value of the stack, a denomination of each bill in the stack or any suitable attribute of the stack.

For example, cash stack 703 may be inserted into purge-bin 700. Separator tabs 707 and 709 may close adjacent to cash stack 703. Separator tabs 707 and 709 may close upon the detection of cash in purge-bin 700. A partition within purge-bin 700 may be a predetermined location for the storage of cash.

Prior to an insertion of stack 703 in purge-bin 700, separator tabs 709 and 707 may be positioned substantially parallel to housing wall 701. Prior to storing of stack 703 in purge-bin 700, separator tabs 709 and 707 may be positioned at angle less than ninety degrees from a portion of housing wall 701. After the insertion of stack 703 into purge-bin 700, separator tabs 707 and 709 may rotate to a position substantially perpendicular to housing wall 701. Upon release of a latch (not shown) a biasing member (not shown) may rotate separator tabs 707 and 709 about hinges 721 and 719.

Purge-bin 700 may include compactor 717. Compactor 717 may be extendable. Compactor 717 may be configured to exert pressure on a stack. Compactor 717 may be configured to exert pressure on a separator tab.

For example, compactor 717 may exert pressure on stack 703. Compactor 717 may push stack 703 against a wall of purge-bin 700. Compactor 717 may exert pressure on separator tabs 709 and 707. For example, compactor 717 may push stack 715 within purge-bin 700. Push the stack 715 may compress separator tab 707 against housing wall 701. The compression of separator tab 707 against housing wall 701 may trigger a release of separator tabs 709 and 707.

Separator tabs 709 and 707 may translate within purge-bin 700 in response to pressure exerted by compactor 717. For example, separator tab 707 may be configured to translate along a length of housing wall 701. Pressure exerted by compactor 717 may push a stack against a side of purge-bin 700. Pressure exerted by compactor 717 may prevent an inefficient use of storage space within purge-bin 700.

Figure 8:
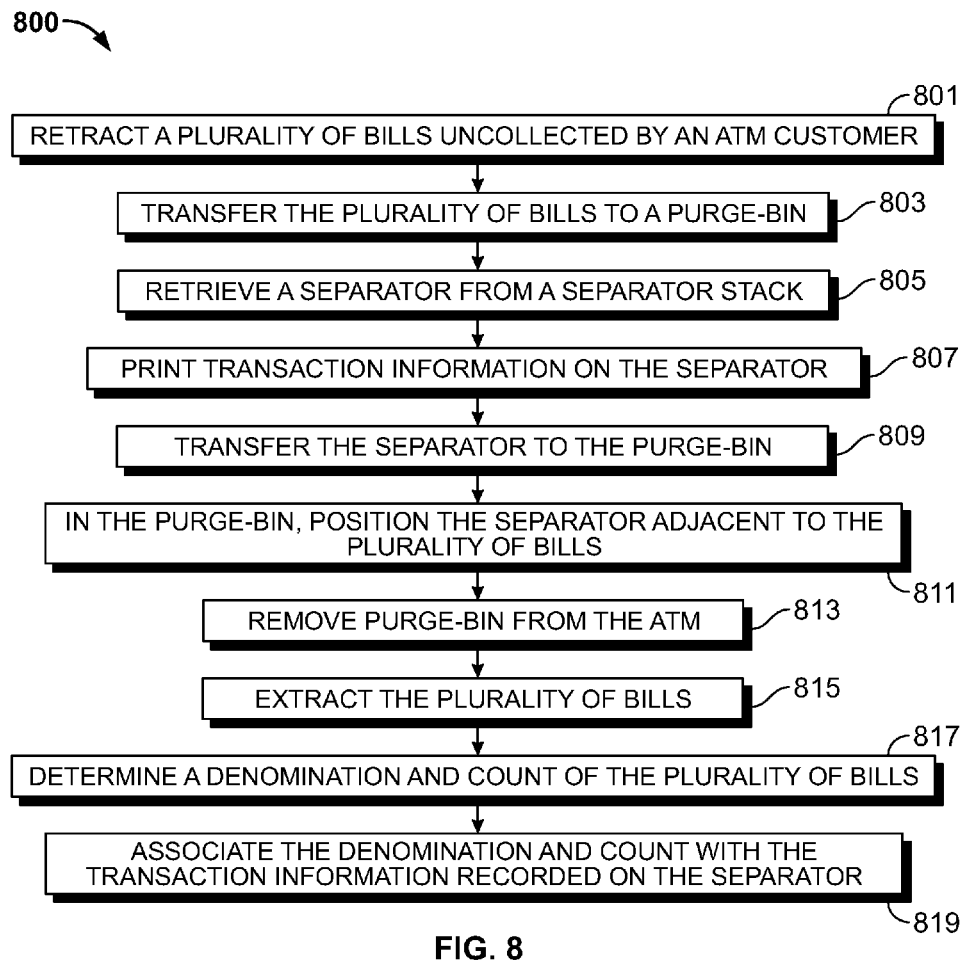
FIG. 8 shows an illustrative process in accordance with principles of the invention.

FIG. 8 shows illustrative process 800. For the sake of illustration, the steps of the process illustrated in FIG. 8 will be described as being performed by a "system." The "system" may include one or more of the features of the apparatus that are shown in FIGS. 1-7 and/or any other suitable device or approach. The "system" may be provided by an entity. The entity may be an individual, an organization or any other suitable entity.

At step 801, the system retracts a plurality of bills. The bills may have been dispensed to an ATM customer. The system may retract bills that were not collected by the customer. At step 803, the system transfers the plurality of retracted bills. The bills are transferred to a purge-bin. The bills may be transferred to the purge-bin by any suitable means. For example, a feeder network may be used to transport the retracted bills from the dispenser to the purge-bin.

At step 805, the system retrieves a separator. The separator is retrieved from a separator stack. The separator stack may store one or more separators. At step 807, the system prints transaction information on the separator. The transaction information may include any suitable information. The transaction information may include information that associates the retracted bills with a transaction and/or customer.

At step 809, the system transfers the separator to the purge-bin. A feeder network within a SSK may transfer the separator from the separator stack to the purge-bin. At step 811, the system positions the separator adjacent to the plurality of retracted bills. A position of the separator with respect to the plurality of retracted bills may associate the separator with the retracted bills.

At step 813, the purge-bin may be removed from an SSK, such as an ATM. Armored personnel and services may be employed to remove the purge-bin. At step 815, bills stored in the purge-bin are extracted from the purge-bin. At step 817, the system examines the bills extracted from the purge-bin. The examination may determine one or more denominations of each bill extracted from the purge-bin. The system may determine a count of the plurality of bills. The plurality may correspond to a stack of bills such as stacks 303 and 301 (shown in FIG. 3), stacks 509 and 507 (shown in FIG. 5) or stacks 601 and 605 (shown in FIG. 6). The denomination and a count may be determined for each stack of bills stored in the purge-bin.

At step 819, the system associates the denomination with the transaction information recorded on the separator. The system may associate the count with the transaction information. The transaction information may be the transaction information that was recorded on the separator positioned adjacent to the plurality of bills within the purge-bin. The separator may be associated with the bills based on a position, in the purge-bin, of the separator relative to the bills.

Figure 9:
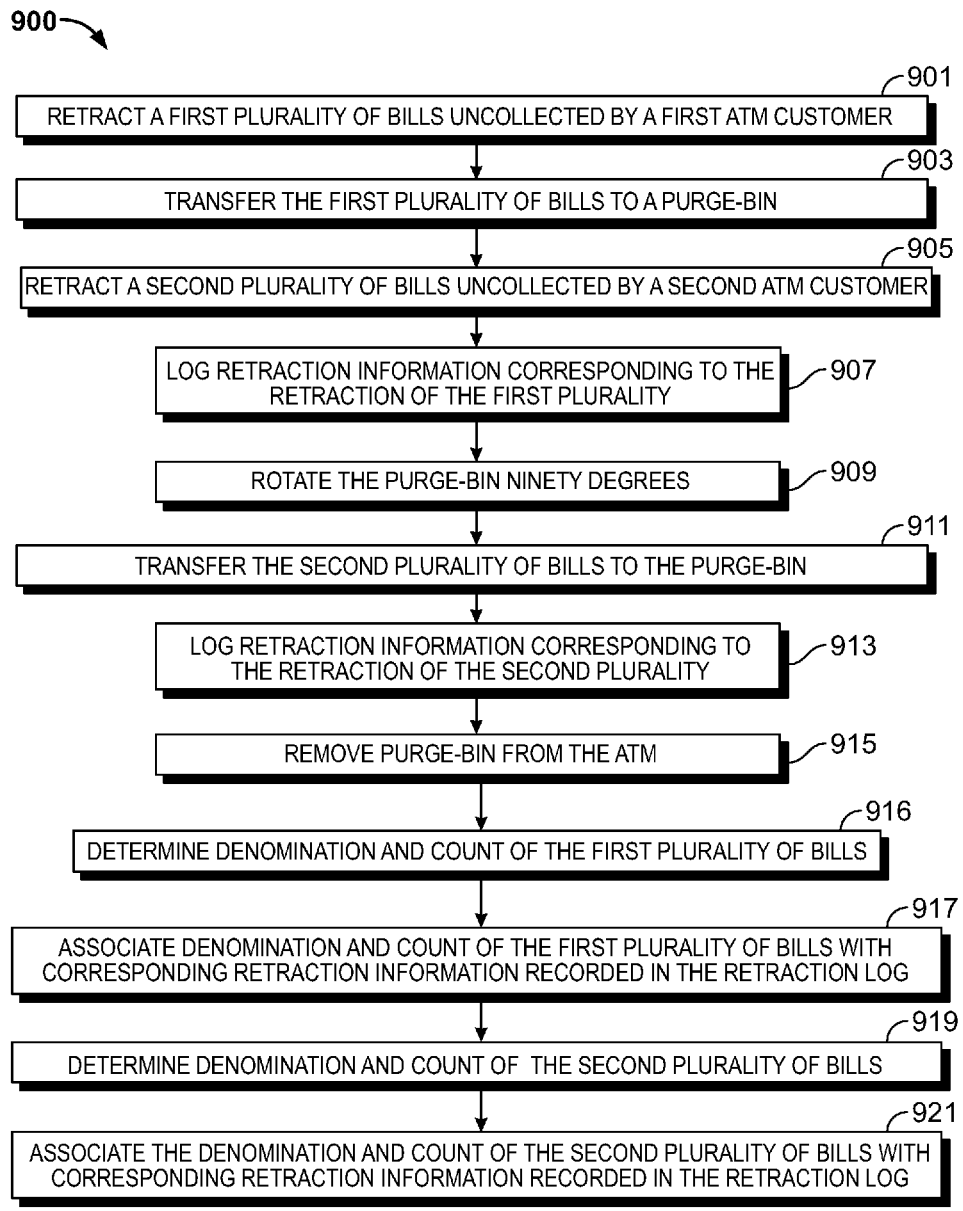
FIG. 9 shows an illustrative process in accordance with principles of the invention.

FIG. 9 shows illustrative process 900. For the sake of illustration, the steps of the process illustrated in FIG. 9 will be described as being performed by a "system." The "system" may include one or more of the features of the apparatus or approach that are shown in FIGS. 1-8 and/or any other suitable device or approach. The "system" may be provided by an entity. The entity may be an individual, an organization or any other suitable entity.

At step 901, the system retracts a first plurality of bills. Prior to the retracting, the bills may have been dispensed to a first ATM customer. The first plurality of bills may be bills that remained uncollected by the first customer. At step 903, the system transfers the first plurality of bills to a purge-bin. A feeder network within the ATM may transfer the first plurality of bills to the purge-bin. The feeder network may include rollers, belts, tracks, pickers or any suitable components.

At step 905, the system retracts a second plurality of bills. Prior to the retracting, the second plurality may have been dispensed to a second ATM customer. The second plurality of bills may be bills that remained uncollected by the second customer.

At step 907, the system logs retraction information corresponding to the retraction of the first plurality of bills. The retraction information may include a number of bills dispensed, a number of bills retracted, a monetary value of bills dispensed, a time of the transaction, a date of the transaction and/or a transaction identifier.

At step 909, the system rotates the purge-bin ninety degrees. The purge-bin may be rotated using mechanical, magnetic and/or electrical force. Rotating the purge-bin may align a bill receiving feature of the purge-bin with a feeder network. Rotating the purge-bin may select a bill receiving section of the purge-bin to receive the retracted bills. At step 911, the system transfers the second plurality of bills to the purge-bin. The bills may be transferred by any suitable means. The second bills may be transferred using a feeder network.

At step 913, the system logs retraction information corresponding to the retraction of the second plurality of bills. At step 915, the purge-bin is removed from the ATM. Armored personnel and services may be employed to remove the purge-bin. At step 916, the system determines one or more denominations of bills included in the first plurality of bills. For example, the system may determine that the first plurality includes three twenty-dollar bills and two ten-dollar bills.

The system may determine a count of the number of bills. For example, the system may determine that there were three bills retracted. The system may identify a tangible item extracted from the purge-bin. For example, the system may determine that the tangible item is a separator.

At step 917, the system associates the denomination and count of the first plurality of bills with the retraction information logged at step 907. The denomination and count corresponding to the first plurality of bills may be recorded in a retraction log such as retraction log 422 (shown in FIG. 4). Associating the denomination and count with the retraction information logged at step 907 may allow the system to identify the first customer. Associating the denomination and count with the retraction information logged at step 907 may allow the system to associate one or more actions performed by the ATM with the first plurality of retracted bills.

At step 919, the system determines one or more denominations of the second plurality of bills. The system may determine a count of the second plurality of bills. The system may determine the type of notes retracted. At step 921, the system associates the denomination and count of the second plurality of bills with the retraction information logged at step 913. The denomination and count of the second plurality of bills may be recorded in a retraction log such as retraction log 422 (shown in FIG. 4). Associating the denomination and count with the retraction information logged at step 913 may allow the system to identify the second customer. Associating the denomination and count with the retraction information logged at step 913 may allow the system to associate one or more actions performed by the ATM with the second plurality of retracted bills.

Figure 10:
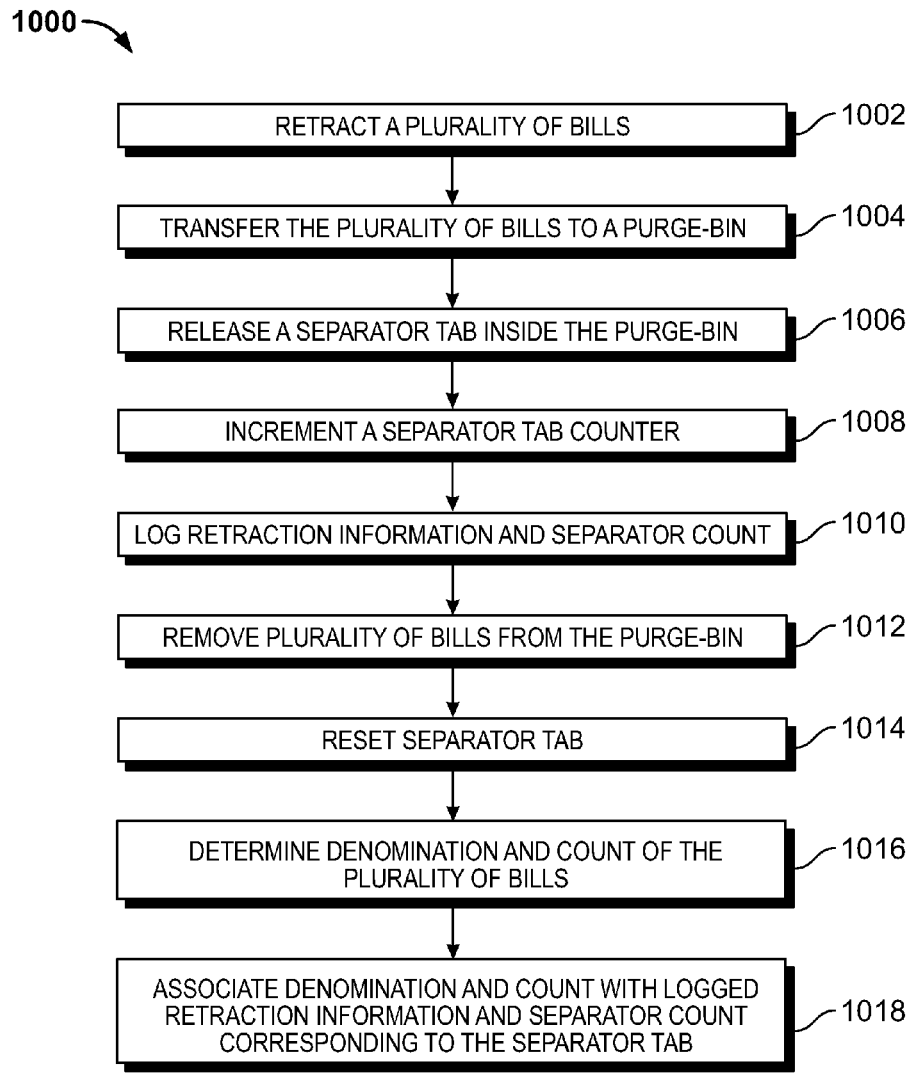
FIG. 10 shows an illustrative process in accordance with principles of the invention.

FIG. 10 shows illustrative process 1000. For the sake of illustration, the steps of the process illustrated in FIG. 10 will be described as being performed by a "system." The "system" may include one or more of the features of the apparatus or approach that are shown in FIGS. 1-9 and/or any other suitable device or approach. The "system" may be provided by an entity. The entity may be an individual, an organization or any other suitable entity.

At step 1002, the system retracts a plurality of bills. At step 1004, the system transfers the plurality of bills retracted in step 1002. The bills may be transferred to a purge-bin such as purge-bin 700 (shown in FIG. 7). The bills may be transferred using a feeder network.

At step 1006, the system releases a separator tab inside the purge-bin. The separator tab may be released in response to receiving an electronic signal from a control system such as apparatus 400 (shown in FIG. 4). At step 1008, the system increments a separator tab counter. The separator tab counter may be incremented each time a separator tab is released inside the purge-bin.

At step 1010, the system logs retraction information. For example, the system may log the separator tab count. At step 1012, the system may remove the plurality of bills from the purge-bin. At step 1014, the system may reset the separator tab. At step 1016, the system may determine one or more denominations of the plurality of bills. The one or more denominations of the plurality of bills may be associated with the reset separator tab. The system may determine the count of the plurality of bills. The count of the plurality of bills may be associated with the reset separator tab.

At step 1018, the system associates the denomination and count of the bills with the retraction information logged at step 1010. The retraction information may identify a customer and customer account. The retraction information may identify one or more transactions or action performed by a SSK. Associating the denomination and count of the bills with the retraction information may identify a customer or account associated with the retracted plurality of bills. Associating the denomination and count of the bills with the retraction information may identify a value of bills collected by a customer during an ATM session.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for a stacking purge-bin have been provided. Persons skilled in the art will appreciate that the present invention can be practiced by other than the described embodiments, which are presented for purposes of illustration rather than of limitation. The present invention is limited only by the claims that follow.

What is claimed is:

1. A method of storing bills in a purge-bin of an automated teller machine ("ATM"), the method comprising:
    retracting a plurality of bills from an ATM dispenser;
    generating a separator record, the separator record comprising:
        a date;
        a time; and
        a transaction identifier;
    associating the separator record with a separator tab of the purge-bin;
    releasing the separator tab;
    storing the plurality of bills in the purge-bin;
    extracting the plurality of bills from the purge-bin;
    determining a value corresponding to the plurality of bills;
    based on the separator tab, associating the value with the separator record;
    appending the value to the separator record;
    identifying a request for an amount of funds associated with the transaction identifier;
    based on the transaction identifier, associating the separator record with a customer account; and
    when the amount is greater than the value, debiting the customer account a difference between the amount and the value.

2. The method of claim 1 wherein when the plurality of bills is a first plurality of bills stored in the purge-bin, the separator tab separates the first plurality of bills from a second plurality of bills.

3. The method of claim 2 further comprising:
based on the transaction identifier, associating the separator record with a customer account; and
crediting the value to the customer account.

4. The method of claim 1 further comprising at a computer system of a financial institution:
receiving a mis-dispense claim from a customer, the mis-dispense claim comprising a requested refund amount; and
adjusting the requested refund amount based on the value.

5. The method of claim 1 wherein the storing comprises enveloping the plurality of bills with a shrink-wrap.

6. The method of claim 1, wherein:
the separator comprises a sleeve; and
the storing comprises inserting the plurality of bills into the sleeve.

7. A method of storing bills in a purge-bin of an automated teller machine ("ATM"), the method comprising:
retracting a plurality of bills from an ATM dispenser;
generating a separator record, the separator record comprising:
a date;
a time; and
a transaction identifier;
associating the separator record with a separator tab of the purge-bin;
releasing the separator tab;
storing the plurality of bills in the purge-bin;
extracting the plurality of bills from the purge-bin;
determining a value corresponding to the plurality of bills;
based on the separator tab, associating the value with the separator record;
appending the value to the separator record;
receiving a mis-dispense claim from a customer, the mis-dispense claim comprising a requested refund amount; and
adjusting the requested refund amount based on the value.

8. The method of claim 7 wherein when the plurality of bills is a first plurality of bills stored in the purge-bin, the separator tab separates the first plurality of bills from a second plurality of bills.

9. The method of claim 7 further comprising:
based on the transaction identifier, associating the separator record with a customer account; and
crediting the value to the customer account.

10. The method of claim 7 further comprising:
identifying a request for an amount of funds associated with the transaction identifier;
based on the transaction identifier, associating the separator record with a customer account; and
when the amount is greater than the value, debiting the customer account a difference between the amount and the value.

11. The method of claim 7 wherein the storing comprises enveloping the plurality of bills with a shrink-wrap.

12. The method of claim 7, wherein:
the separator comprises a sleeve; and
the storing comprises inserting the plurality of bills into the sleeve.

* * * * *